Patented July 29, 1952

2,605,274

UNITED STATES PATENT OFFICE 2,605,274

ORGANO-POLYSILOXANES AND METHODS OF PREPARATION THEREOF

Leslie J. Tyler, Midland County, Mich., assignor to Dow Corning Corporation, Midland, Mich., a corporation of Michigan No Drawing. Application January 9, 1950, Serial No. 137,669

5 Claims. (Cl. 260—448.2)

This invention relates to new compositions of matter and to methods of preparing cyclic or polymeric organopolysiloxanes.

The present industrial production of organo-silicon products is based upon the employment of organosilanes which contain hydrolyzable groups such as chlorine atoms or ethoxy radicals. Such silanes are hydrolyzed and the resulting hydrolysates are condensed to give the corresponding organosiloxanes. Likewise the cohydrolysis and co-condensation of mixtures of silanes is employed to produce copolymers with specific desirable properties.

Although many diverse hydrocarbon radicals have been linked to the silicon in silanes for the production of siloxanes, it has been either the methyl or phenyl groups, or both, linked to silicon which have taken precedence in the commercial preparation of organosiloxanes. This is due to the inherent stability of these two groups on silicon as contrasted with the higher alkyl radicals. The use of alkyl siloxanes in which the alkyl radicals are higher than methyl results in a progressive reduction in the stability of the siloxane. Thus, ethyl siloxanes are not nearly as stable as the methyl siloxanes, and propyl siloxanes are not as stable as the ethyl siloxanes.

It is shown in Leo H. Sommer's copending application, Serial No. 103,741, however, that the t-butyl radical is a notable exception to this rule, having a stability which is comparable to that of methyl or phenyl radicals on silicon.

The incorporation of t-butyl substituted silicon into a polymeric or copolymeric siloxane, however, presents a problem seldom encountered in organosilicon chemistry. Hydrolysis of di-t-butyldichlorosilane, for example, readily produces di-t-butylsilanediol, but this compound is unlike the hydrolysis products of other alkyl-silanes, and condensation is extremely difficult, if not impossible, to bring about. Hence, if cohydrolysis is attempted with other organo-siliconhalides, a copolymer can not readily be obtained in any practical yield.

It has also been found that diphenyldichloro-silane presents the same difficulty, although to a lesser degree than the t-butylchlorosilanes. That is, if a cohydrolysis of diphenyldichloro-silane with another organohalosilane is attempted, diphenylsilanediol is formed. Extensive intercondensation of the mixture of silanols is not obtained, because of the stability of the diphenylsilanediol and because of its tendency to remain in a phase separate from the remainder of the reaction product. This phenomenon is particularly troublesome if a copolymer rich in diphenyl substituted silicon atoms is desired, for diphenylsilanediol is at best merely an expensive by-product.

It is an object of this invention to provide improved methods for the preparation of siloxane copolymers; for the incorporation of t-butyl substituted silicon atoms into linear and cyclic polysiloxane copolymers, thereby producing new compositions of matter; and for the preparation of organopolysiloxanes which are rich in diphenyl substituted silicon atoms.

Other objects and advantages will be apparent from the following description.

In accordance with a preferred form of the present invention a dialkoxy silane or dialkoxy siloxane is reacted with a silane diol in which the silicon atom is bonded to two substituents of the group t-butyl and phenyl. The reaction is not dependent upon temperature. It is brought about by contacting the reactants in liquid phase. Reduction of the operating temperature has the effect of reducing the rate of reaction as is common with many processes. Preferably, however, the reaction is conducted at a temperature such that vaporization of the alcohol produced will be obtained at the pressure employed.

The dialkoxy silanes or dialkoxy siloxanes employed in the process of this invention are compounds of the general formula

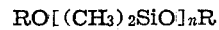

in which $n$ has a value of from 1 to 11 inclusive and R represents an alkyl radical of less than 5 carbon atoms. It will be apparent that alkoxy end-blocked siloxanes other than the

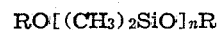

shown would be perfectly operable in this invention, since compounds such as $RO(C_6H_5CH_3SiO)_nR$, $RO[(C_2H_5)_2SiO]_nR$ and $RO(C_6H_5C_2H_5SiO)_nR$ would react in an analagous manner. The dialkoxy siloxanes may be prepared as described in U. S. Patent No. 2,415,389.

The silane diols employed in the process of this invention are compounds of the general formula R'$_2$Si(OH)$_2$, in which each R' represents a radical of the group consisting of t-butyl and phenyl radicals. The t-butylsilanediols may be obtained by the hydrolysis of the product from the reaction of t-butyllithium with a silicon halide, as set forth in detail in the copending application of Leo H. Sommer, Serial No. 103,741. Diphenylsilanediol is well known to the art.

The reaction of this invention may be carried out at atmospheric, subatmospheric, or superatmospheric pressures. The temperature employed is not critical. It is preferably below 250° C., and at least the boiling point of the by-produced alcohol at the pressure employed. The alcohol formed in the reaction may also be removed by vaporization at below its boiling point by such well known methods as blowing a stream of air through the reaction mixture. The reaction proceeds satisfactorily in the absence of a catalyst, but acidic catalysts such as H$_2$SO$_4$ and HCl, or alkaline catalysts such as NaOH and KOH, may be employed if desired.

The proportions of the reactants may be varied in accordance with the type of product desired, but since the reaction is to a large extent metathetical, it is uneconomic to exceed the ratio of ten mols of either reactant to one mol of the other.

The products of this invention are the alcohol corresponding to the alkoxy end-blocked silane or siloxane used, and various siloxane copolymers. These copolymers are represented in part by cyclic polysiloxanes of the general formula [(Me$_2$SiO)$_x$(R'$_2$SiO)$_y$] in which $x$ and $y$ are whole positive integers, the sum of which is at least 3; and in which each R' represents a radical of the group consisting of t-butyl and phenyl radicals. For the sake of simplicity, the methyl radical has been represented by the symbol Me in the above general formula.

Linear hydroxy or alkoxy end-blocked polysiloxanes which contain both types of siloxane units are also formed as products of this process.

The products of my invention are useful as instrument damping fluids and in hydraulic pressure systems. The crystalline cyclic polysiloxanes of this invention may be further copolymerized with materials such as octamethylcyclotetrasiloxane, by conventional means well known to the industry, to produce high polymer fluids which are useful as steel on steel lubricants and as special lubricants for glass, rubber, and plastics.

The following examples describe specific embodiments of the invention, but are not to be construed as limiting the scope thereof. All parts given are by weight.

Example 1

A mixture comprising 44 parts of di-t-butylsilanediol, 45 parts of dimethyldiethoxysilane, and about 2 parts of conc. H$_2$SO$_4$ was heated at 100° C. for 24 hours. It was then distilled to remove ethanol and unreacted dimethyldiethoxysilane. A polysiloxane residue remained amounting to 70 per cent of theoretical. From the polysiloxane there was isolated crystalline 1,1,5,5-tetramethyl-3,3,7,7-tetra-t-butylcyclotetrasiloxane which was found to have a melting point of 244.5–245.7° C. The liquid portion of the product was identified as a dimethyldi-t-butylpolysiloxane copolymer.

Example 2

A mixture of 98 parts of t-butylphenylsilanediol and 85 parts of dimethyldiethoxysilane was heated under reflux over a 3 hour period. The temperature, initially 126° C., dropped to 112° C. the ethanol formed was then removed by distillation. The residue was a viscous liquid, which analysis showed was a dimethyl-t-butylphenylpolysiloxane copolymer.

Example 3

A mixture of 108 parts of diphenylsilanediol and 85.5 parts of dimethyldiethoxysilane was heated at reflux temperature for 68 hours, during which period the reaction temperature fell from an original 119° C. to 88°C. Ethanol and unreacted dimethyldiethoxysilane were removed by distillation. The liquid residue was distilled further at reduced pressure, yielding 89 parts of distillate. From a fraction boiling at 195° C. at 0.35 mm. pressure there was isolated the crystalline compound, 1,1,5,5-tetramethyl-3,3,7,7-tetraphenylcyclotetrasiloxane, obtained as long white needles melting at 131–132° C. The remainder of the distillate was shown by analysis to be a dimethyl-diphenylpolysiloxane copolymer.

Example 4

A mixture of 216 g. of diphenylsilanediol and 202 g. of tetramethyl-1,3-diethoxydisoloxane, EtO(Me$_2$SiO)$_2$Et, was heated at 100° C. for 64 hours. The low boiling components including ethanol were removed and the reaction products were distilled at reduced pressure. In the range of 99–109° C. at 0.3 mm. pressure a partially solid material was obtained. Recrystallization of these solids gave white crystals, melting at 62–64° C., which analysis showed to be 1,1-diphenyltetramethylcyclotrisiloxane. Analysis of the liquid portion of the distillate showed it to be an ethoxy end-blocked dimethyldiphenylpolysiloxane copolymer.

Example 5

Dimethyldiethoxysilane was hydrolyzed with a limited amount of water to obtained a mixture of ethoxy end-blocked dimethylsiloxanes. This mixture was flash distilled to a temperature of 150° C. at about 20 mm. pressure to remove the low boiling components. The residue from this distillation was found to have a viscosity of 5.15 centistokes at 25° C., an ethoxy content of about 12 per cent by weight, and an average of about 9 silicon atoms per mol. A mixture of 740 g. of the above residue and 200 g. of diphenylsilanediol was heated at 125° C. for 16 hours, ethanol being distilled off as it was evolved. The last traces of ethanol were then removed by a flash distillation to 150° C. under reduced pressure. The residue was a dimethyl-diphenylpolysiloxane liquid copolymer.

That which is claimed is:

1. The method which comprises contacting in liquid phase an organo-silicon compound of the general formula RO[(CH$_3$)$_2$SiO]$_n$R, in which $n$ has a value of from 1 to 11 inclusive and R represents an alkyl radical of less than 5 carbon atoms, with a silane diol of the general formula $$R'R''Si(OH)_2$$

in which R' represents a radical of the group consisting of t-butyl and phenyl radicals and R''